US011637477B2

(12) United States Patent
Gentile

(10) Patent No.: US 11,637,477 B2
(45) Date of Patent: Apr. 25, 2023

(54) ROTATING MACHINE

(71) Applicant: Joseph Gentile, Milton, GA (US)

(72) Inventor: Joseph Gentile, Milton, GA (US)

( * ) Notice: Subject to any disclaimer, the term of this patent is extended or adjusted under 35 U.S.C. 154(b) by 125 days.

(21) Appl. No.: 16/238,271

(22) Filed: Jan. 2, 2019

(65) Prior Publication Data

US 2020/0212761 A1      Jul. 2, 2020

(51) Int. Cl.
| | | |
|---|---|---|
| *H02K 5/173* | (2006.01) | |
| *H02K 7/08* | (2006.01) | |
| *H02K 11/40* | (2016.01) | |
| *H02K 21/22* | (2006.01) | |
| *F16C 19/14* | (2006.01) | |

(52) U.S. Cl.
CPC ............. *H02K 7/083* (2013.01); *F16C 19/14* (2013.01); *H02K 5/1732* (2013.01); *H02K 11/40* (2016.01); *H02K 21/22* (2013.01); *F16C 2380/26* (2013.01)

(58) Field of Classification Search
CPC .... H02K 1/187; H02K 1/2786; H02K 5/1677; H02K 5/1737; H02K 7/086; H02K 21/22; H02K 1/2787–2789; H02K 1/279; H02K 1/2791; H02K 1/27915; H02K 1/2792; H02K 3/47; H02K 5/15; H02K 5/16; H02K 5/161; H02K 5/165; H02K 5/173; H02K 5/1732; H02K 7/08; H02K 7/083; H02K 7/088; F16C 19/14; F16C 2380/26
USPC .......................................................... 310/90
See application file for complete search history.

(56) References Cited

U.S. PATENT DOCUMENTS

| | | | | |
|---|---|---|---|---|
| 2,393,900 | A | * | 1/1946 | Guertin .................... F16C 19/06 310/90 |
| 2,802,957 | A | * | 8/1957 | Gievers ..................... H02K 9/06 310/90 |
| 5,767,598 | A | * | 6/1998 | Kano ....................... H02K 5/15 310/91 |
| 6,142,673 | A | * | 11/2000 | Kottritsch ........... F16C 33/6607 384/476 |
| 7,687,959 | B1 | * | 3/2010 | Lee ........................ H02K 7/085 310/166 |
| 8,212,444 | B2 | | 7/2012 | Popov et al. |
| 9,793,777 | B2 | | 10/2017 | Hofmann et al. |
| 2003/0086630 | A1 | * | 5/2003 | Bramel .................. H02K 11/40 384/476 |

(Continued)

FOREIGN PATENT DOCUMENTS

| | | | | |
|---|---|---|---|---|
| CN | 107508445 | A | * 12/2017 | .......... H02K 1/2786 |
| DE | 10005866 | A1 | * 8/2001 | .......... H02K 7/1025 |

(Continued)

OTHER PUBLICATIONS

Pellegrini, Machine Translation of DE10005866, Aug. 2001 (Year: 2001).*

(Continued)

*Primary Examiner* — Eric Johnson
(74) *Attorney, Agent, or Firm* — Steven C. Stewart

(57) ABSTRACT

Example aspects of a rotating machine, a method for preloading a rotating machine, and a method for using a rotating machine are disclosed. The rotating machine can comprise a stator; a rotor, wherein one of the stator and the rotor comprises a mounting flange formed monolithically therewith; a bearing directly mounted to the mounting flange; and the other of the stator and the rotor directly mounted to the bearing.

17 Claims, 5 Drawing Sheets

(56) References Cited

U.S. PATENT DOCUMENTS

| | | | | |
|---|---|---|---|---|
| 2005/0104470 A1* | 5/2005 | Perkins | ............... | H02K 21/222 |
| | | | | 310/254.1 |
| 2009/0289512 A1* | 11/2009 | Prucher | ................ | H02K 3/47 |
| | | | | 310/54 |
| 2010/0164313 A1* | 7/2010 | Langford | ............... | H02K 7/083 |
| | | | | 310/90 |
| 2010/0253167 A1* | 10/2010 | Charnley | ............ | H02K 1/2786 |
| | | | | 310/83 |
| 2016/0069352 A1* | 3/2016 | Kreidler | ............ | F04D 25/0653 |
| | | | | 417/423.1 |
| 2019/0252867 A1* | 8/2019 | Horng | ................ | F04D 25/088 |

FOREIGN PATENT DOCUMENTS

| | | | | |
|---|---|---|---|---|
| DE | 102008017262 A1 * | 10/2009 | ............ | H02K 7/083 |
| DE | 102014218182 A1 * | 3/2016 | ........... | H02K 5/1732 |
| EP | 0405002 A1 * | 1/1991 | ............... | H02K 5/10 |
| EP | 2532892 | 12/2012 | | |
| GB | 2482704 | 2/2012 | | |
| JP | 2009063131 A * | 3/2009 | | |
| JP | 2013093985 A * | 5/2013 | | |
| WO | WO-2004038241 A1 * | 5/2004 | ............. | F16C 19/52 |

OTHER PUBLICATIONS

Stoelzle, Machine Translation of DE102008017262, Oct. 2009 (Year: 2009).*
Watanabe, Machine Translation of JP2009063131,Mar. 2009 (Year: 2009).*
Jakob, Machine Translation of EP0405002, Jan. 1991 (Year: 1991).*
Frohlich, Machine Translation of DE102014218182, Mar. 2016 (Year: 2016).*
Sano, Machine Translation of JP2013093985, May 2013 (Year: 2013).*
Zimmermann, Machine Translation of WO2004038241, May 2004 (Year: 2004).*

* cited by examiner

ROTATING MACHINE

TECHNICAL FIELD

This disclosure relates to rotating machines. More specifically, this disclosure relates to a rotating machine comprising a rotor rotatably mounted to a stator.

BACKGROUND

Rotating machines can typically comprise a shaft, a static element (e.g., a stator) fixedly mounted to the shaft, and a dynamic element (e.g. a rotor) rotatably mounted to the shaft by one or more anti-friction mechanisms (e.g., bearings). The anti-frictional mechanisms can be spaced apart from the static element along the shaft, and a support element can support the dynamic element one the anti-friction mechanisms. One of the static element and dynamic element can comprise permanent magnets for generating a magnetic field, and the other of the static element and dynamic elements can comprises conductors (e.g., electromagnets) that can interact with the magnetic field to generate rotational forces.

Spacing the anti-friction mechanisms on the shaft away from static element can create an undesirably large distance between the dynamic element of the rotating machine and the load carrying-elements (i.e., the anti-friction mechanisms). The mass of various components of the rotating machine, such as the support element, must be increased to accommodate the large distance, which can further increase the load carried on the anti-friction mechanisms.

It is also typically required that a space be maintained between the permanent magnets and conductors, commonly referred to as an air gap. Preferably, the air gap is as small as possible. However, various factors can make it difficult to maintain a desired air gap, such as the tolerances of the various components of the rotating machine. Thus, as the number of components and the number of mechanical interfaces between components increase, the number of tolerances that can affect the air gap can increase. The requirement of a shaft can also increase material, manufacturing, and assembly costs.

Furthermore, plastic deformation of various components of the rotating machine can occur under asymmetric loading (e.g., asymmetric torsional, axial, and linear loading) and can result in unintended contact between components. Incorporating additional anti-friction mechanisms often is required to prevent unintended contact, which can increase the cost of the rotating machine. The additional anti-frictional mechanisms can also define dimensional tolerances and can create additional mechanical interfaces that may affect the air gap.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is rotating machine comprising a stator; a rotor, wherein one of the stator and the rotor comprises a mounting flange formed monolithically therewith; a bearing directly mounted to the mounting flange; and the other of the stator and the rotor directly mounted to the bearing.

Also disclosed is a method for pre-loading a rotating machine comprising providing a stator and a rotor of the rotating machine, and wherein the rotating machine is configurable in an unloaded state and a pre-loaded state; directly mounting the stator to a bearing and directly mounting the rotor to the bearing in the unloaded state, wherein the bearing comprises an inner race and an outer race; and applying an axial force to the bearing in the pre-loaded state to axially displace the inner race relative to the outer race.

Also disclosed is a method for using a rotating machine comprising providing a static element and a dynamic element; directly mounting an anti-friction element to one of the static element and dynamic element; directly mounting the other of the static element and dynamic element to the anti-friction element; generating a magnetic field with a magnetized material, interacting a conductor with the magnetic field to generate a rotational force; and applying the rotational force to the dynamic element to rotate the dynamic element relative to the static element.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
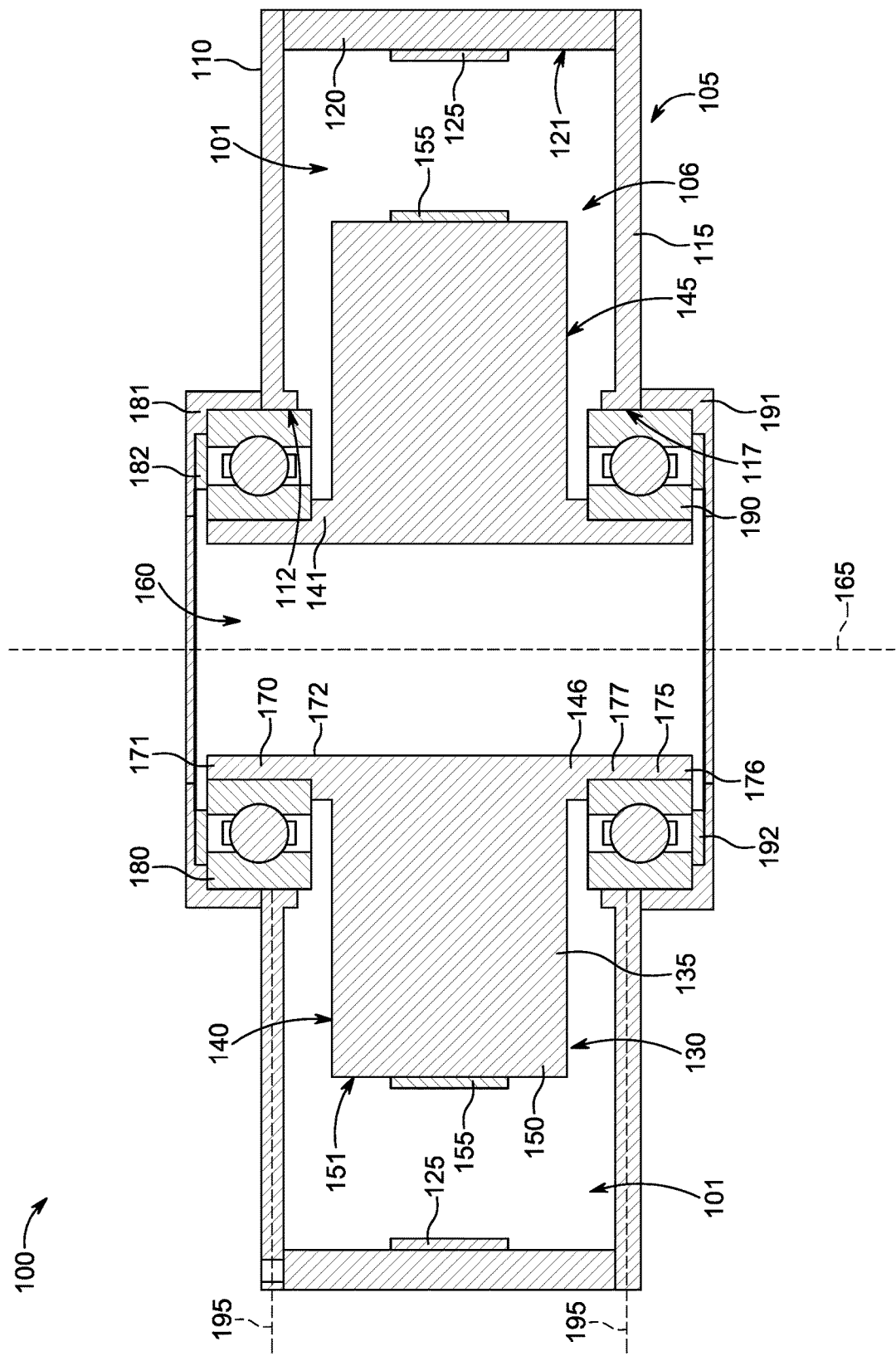
FIG. 1 is a cross-sectional view of a rotating machine, in accordance with one aspect of the present disclosure, taken along line 1-1 in FIG. 9.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a rotating machine and associated methods, systems, devices, and various apparatus. Example aspects of the rotating machine can comprise a static element, a dynamic element, and an anti-friction mechanism. The anti-friction mechanism can be mounted on one of the static element and dynamic element, and the other of the static element and dynamic element can be mounted on the anti-friction mechanism. It would be understood by one of skill in the art that the disclosed rotating machine is described in but a few exemplary aspects among many. No particular terminology or description should be considered limiting on the disclosure or the scope of any claims issuing therefrom.

FIG. 1 illustrates a first aspect of a rotating machine 100 according to the present disclosure. As shown, the rotating machine 100 can comprise a dynamic element, such as a rotor 105, and a static element, such as a stator 130. In the present aspect, as shown, the rotor 105 can define a substantially cylindrical shape. Example aspects of the rotor 105 can comprise a rotor top plate 110, a rotor bottom plate 115 extending substantially perpendicular to the rotor top plate 110, and a rotor sidewall 120 extending therebetween. The rotor sidewall 120 and the rotor top and bottom plates 110,115 can define an interior rotor cavity 106, as shown. The rotor top plate 110 can also define a top opening 211 (shown in FIG. 2) extending therethrough, and the rotor bottom plate 115 can define a bottom opening 216 (shown in FIG. 2) extending therethrough. According to example aspects, one or more permanent magnets 125 can be coupled to an inner surface 121 of the rotor sidewall 120. According to example aspects, the permanent magnets 125 can be coupled to the inner surface 121 by an adhesive, such as a glue. In other aspects, the permanent magnets 125 can be coupled to the inner surface 121 by another suitable fastener, such as, for example, screws, pins, clips, ties, and the like. The permanent magnets 125 can generate a magnetic field. In other aspects, the rotor sidewall 120 be formed from a magnetized material, or the inner surface 121 of the rotor sidewall 120 can be coated with a magnetized material, that can generate a magnetic field. According to example aspects, the rotor top plate 110 and rotor bottom plate 115 can be formed from a non-ferrous material, such as, for example aluminum, copper, tin, etc.

As shown, in example aspects, the stator 130 can define a substantially cylindrical stator body 135. The stator body 135 can define a stator top surface 140, a stator bottom surface 145, and a stator sidewall 150 as shown. Example aspects of the stator body 135 can be oriented within the rotor cavity 106 of the rotor 105. In example aspects, one or more conductors, such as electromagnets 155, can be coupled to an outer surface 151 of the stator sidewall 150 by a fastener, such as, for example an adhesive, such as a glue; however, in other aspects, the electromagnets 155 can be coupled to the outer surface 151 by another suitable fastener, such as, for example, screws, pins, clips, ties, and the like. In other aspects, electromagnetic windings can be wrapped around the stator sidewall 150. In still other aspects, the stator sidewall 150 can be formed from a conductive material or the outer surface 151 of the stator sidewall 150 can be coated in a conductive material that can interact with the magnetic field. According to example aspects, an electric current can be supplied to the conductors (e.g., electromagnets 155 or electromagnetic windings) by a motor (not shown). In example aspects, the motor can be connected to a power supply (not shown), such as, for example, a battery, configured to power the motor. In example aspects, the electric current can be transferred from the motor the electromagnets 115 or electromagnetic windings by a conductive wire, a brush, or by any other suitable current-conducting device known in the art. The current-carrying conductors (e.g., electromagnets 155 or electromagnetic windings) can be configured to interact with the magnetic field generated by the permanent magnets 125, as will be described in further detail below.

A cylindrical stator bore 160 can be formed through a center of the stator 130 and can extend from the stator top surface 140 and the stator bottom surface 145. As shown, the stator bore 160 can define a central axis 165 therethrough. Example aspects of the stator bore 160 can be configured to receive a shaft or shaft-like device (not shown) in example aspects, if, for example, such a device is required for the transmission of power. The stator 130 can further comprise a cylindrical top mounting flange 170 extending outward from the stator top surface 140 and a cylindrical bottom mounting flange 175 extending outward from the stator bottom surface 145. As such, as shown, in example aspects, the cylindrical stator bore 160 can extend from a distal end 171 of the top mounting flange 170 to a distal end 176 of the bottom mounting flange 175. According to example aspects, each of the top mounting flange 170 and bottom mounting flange 175 can be monolithically formed with the stator body 135.

Example aspects of the stator 130 can comprise a circular top lip 141 extending from the stator top surface 140. The circular top lip 141 can extend around a proximal end 172 of the top mounting flange 170. A circular bottom lip 146 can be configured substantially the same as the top lip 141 and can be configured to extend around a proximal end 177 of the bottom mounting flange 175.

According to example aspects, the top mounting flange 170 can extend through the top opening 211 (shown in FIG. 2) of the rotor top plate 110 and the bottom mounting flange 175 can extend through the bottom opening 216 (shown in FIG. 2) of the rotor bottom plate 115. Furthermore, example aspects of the rotating machine 100 can comprise one or more anti-friction mechanisms, such as, for example, a top bearing 180 and a bottom bearing 190. The top bearing 180 can be directly mounted to the top mounting flange 170 and the bottom bearing 190 can be directly mounted to the bottom mounting flange 175. According to example aspects, the top bearing 180 can engage a peripheral edge 112 of the top opening 211 and the bottom bearing 190 can engage a peripheral edge 117 of the bottom opening 216, such that the rotor 105 can rotate relative to the stator 130. As such, it can be seen that the top and bottom bearings 180,190 can be mounted directly on the monolithic top and bottom mounting flanges 170,175 of the stator 130, respectively, and the rotor 105 can be mounted directly on the top and bottom bearings 180,190. In other aspects, the top and bottom mounting flanges 170,175 can be monolithically formed with the rotor 105. In such aspects, the top and bottom bearings 180,190 can be mounted directly on the monolithic top and bottom mounting flanges 170,175 of the stator 130, respectively, and the rotor 105 can be mounted directly on the top and bottom bearings 180,190. The top and bottom bearings 180,190 are described in further detail below with respect to FIG. 5.

Example aspects of the rotating machine 100 can further comprise a top bearing cover 181 and a bottom bearing cover 191. As shown, the top bearing cover 181 can be configured to cover an external portion of the top bearing 180 to prevent damage to the top bearing 180. According to example aspects, the top bearing cover 181 can be attached to the rotating machine 100 by friction fit. In other aspects, the top bearing cover 181 can be attached to the rotating machine by another suitable fastener, such as, for example, screws, adhesives, magnets, and the like. The bottom bearing cover 191 can be configured to cover and protect the bottom bearing 190 in the same way. Example aspects of the top and bottom bearing covers 181,191 can be formed from a number of suitable materials, including but not limited to, rubber, metal, and plastic.

In some aspects, as shown in FIG. 1, a top conductive element 182 can be positioned between the top bearing 180 and the top bearing cover 181, and a bottom conductive element 192 can be positioned between the bottom bearing 190 and the bottom bearing cover 191. In one example aspect, each of the top and bottom conductive elements 182,192 can be substantially shaped as an annulus, and can be formed from a conductive material, such as, for example, copper, aluminum, iron, or any other suitable conductive material known in the art. The top conductive element 182 and bottom conductive element 192 can serve to ground electrical charges created during operation of the rotating machine 100, as described in further detail below.

According to example aspects, the permanent magnets 125 of the rotor 105 can generate a magnetic field, and the electromagnets 155 of the stator 130 can carry the current. The current of the electromagnets 155 can interact with the magnetic field to generate a rotational force. The rotational force can rotate the rotor 105 on the top and bottom bearings 180,190 while the stator 130 remains static. Because the rotor top plate 110 and rotor bottom plate 115 can be formed from a non-ferrous material, the rotor top and bottom plates 110,115 do not interfere with the magnetic field. The present rotating machine 100 can be used in various applications, such as, for example, fans (such as ceiling fans), turbines, motors, drive trains, and the like.

For example, in one aspect, the rotating machine 100 can be used in a ceiling fan application. Fan blades of the ceiling fan (not shown) can be mounted to the rotor 105, such that the fan blades can rotate along with the rotor 105, as the rotor 105 rotates relative to the stator 130. The fan blades can be mounted to the rotor top plate 110, rotor bottom plate 115, and/or the rotor sidewall 120. Example aspects of the fan blades can be secured to the rotor 105 by one or more fasteners, including, but not limited to, adhesives, clips, screws, and the like.

As shown, an air gap 101 can be formed between the electromagnets 155 of the stator 130 and the permanent magnets 125 of the rotor 105. According to example aspects, the dimensions of the air gap 101 can affect the performance of the rotating machine 100, and thus it can be desired to maintain an ideal air gap 101. However, each component of the rotating machine 100 can define dimensional tolerances that can make it difficult to maintain the ideal air gap 101. Thus, reducing the number of components of the rotating machine 100 can advantageously reduce the number of tolerances that can affect the dimensions of the air gap 101. Furthermore, reducing the number of mechanical interfaces between the components can reduce the amount of play between the interfaced components that can also affect the dimensions of the air gap 101. As such, it can be seen that mounting the top and bottom bearings 180,190 directly to the stator 130 can advantageously reduce the number of components of the rotating machine 100 and the number of mechanical interfaces between components, as compared to traditional shaft-mounted rotating machines, wherein a stator and various bearings are each independently mounting to a shaft. The reduction in the number of components of the rotating machine 100 can further advantageously reduce material, tooling, and assembly costs.

Mounting the top and bottom bearings 180,190 directly to the top and bottom mounting flanges 170,175 of the stator 130 can allow for a short and direct lines of load transmission 195 from the rotor 105 to the top and bottom bearings 180,190, as shown. Reducing the distance between the load and the load bearing elements (i.e., the top and bottom bearings 180,190) can allow for a reduced mass of various components, such as, for example, the rotor top plate 110 and rotor bottom plate 115.

Moreover, mounting the top and bottom bearings 180,190 directly to the stator 130 can aid in reducing or eliminating plastic deformation of various components of the rotating machine 100 when under asymmetric loading. Asymmetric loading can be caused by asymmetric torsional, axial, and/or linear loads and can result in unintended contact between various components of the rotating machine 100, which can subject various components to plastic deformation. However, directly mounting the top and bottom bearings 180,190 to the static component (i.e. the stator 130) of the rotating machine 100 and directly mounting the dynamic component (i.e. the rotor 105) of the rotating machine 100 to the top and bottom bearings 180,190 can reduce or eliminate opportunities for unintended contact between components, such that the potential for plastic deformation under asymmetrical loading is significantly decreased.

In other aspects, the stator 130 can define the dynamic element and the rotor 105 can define the static element. That is to say, the body 135 and the monolithic top and bottom mounting flanges 170,175 can generally define the dynamic element, and the top plate 110, bottom plate 115, and sidewall 120 can generally define the static element. In some such aspects, a shaft (not shown) can be received through the bore 160 of the dynamic element. In one example aspect, the shaft can be a stationary shaft and the dynamic element can be configured to rotate relative to the stationary shaft. In another example aspect, the shaft can be configured to rotate along with the dynamic element.

Figure 2:
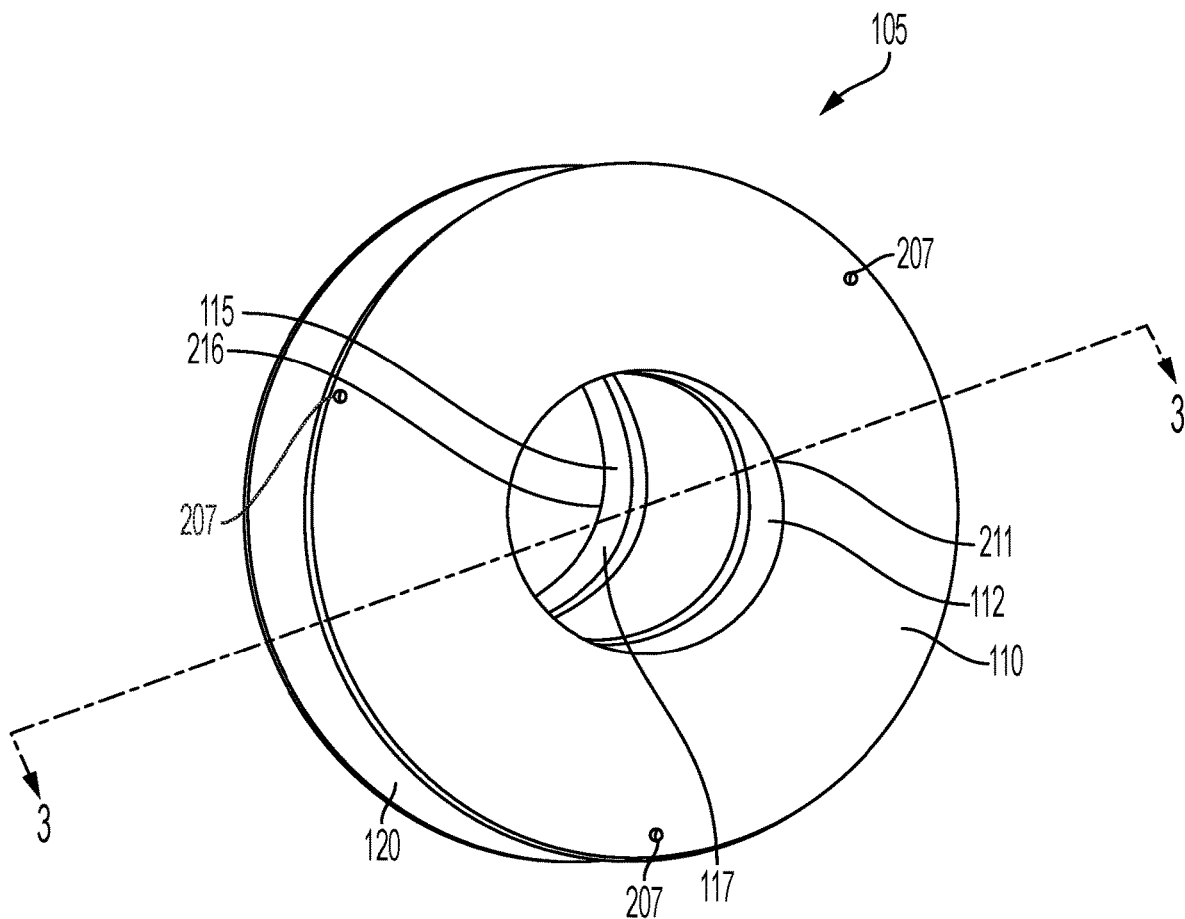
FIG. 2 is a perspective view of a rotor of the rotating machine of FIG. 1.

FIG. 2 illustrates an example aspect of the rotor 105. As shown the rotor 105 can comprise the rotor top plate 110, the rotor sidewall 120, and the rotor bottom plate 115. The rotor top plate 110 can comprise one or more coupling bores 207, as shown, to facilitate coupling the rotor top plate 110 to the rotor sidewall 120. The rotor bottom plate 115 can comprise similar coupling bores 207. In example aspects, a fastener (not shown), such as a screw, can extend through each of the coupling bores 207 in the top plate and bottom plate and can engage corresponding coupling bores 807 (shown in FIG. 8) in the rotor sidewall 120 to couple the rotor top plate 110 and rotor bottom plate 115 to the rotor sidewall 120. In other aspects, the rotor top plate 110 and rotor bottom plate 115 can be monolithically formed with the rotor sidewall 120.

Figure 3:
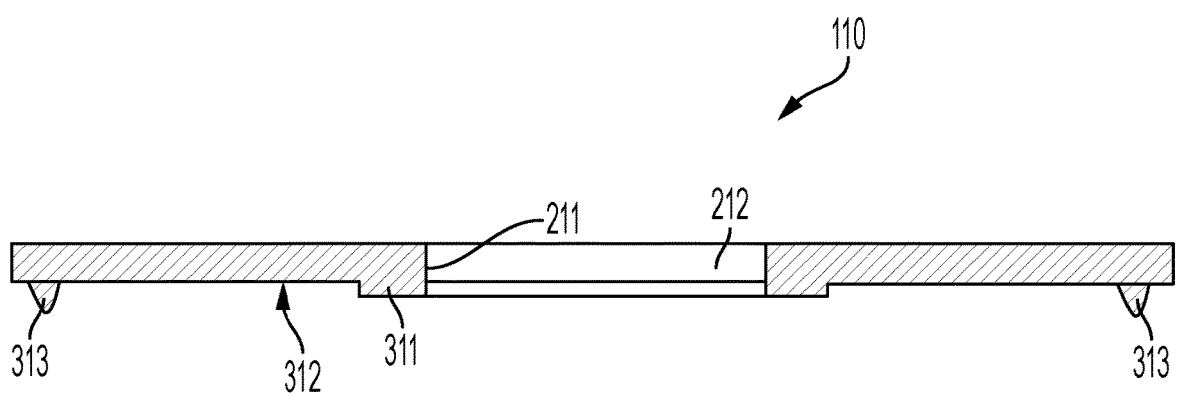
FIG. 3 is a cross-sectional view of a top plate of the rotor of FIG. 2, taken along line 3-3 in FIG. 2.

FIG. 3 illustrates a cross-sectional view of an example aspect of the rotor top plate 110. As shown, the rotor top plate 110 can comprise a cylindrical rotor top flange 311 formed around the top opening 211. In some aspects, the rotor top flange 311 can extend inward from an inner surface 312 of the rotor top plate 110 towards the rotor cavity 106 (shown in FIG. 1). Example aspects of the rotor top flange 311 can be configured to reinforce the peripheral edge 112 of the top opening 211. However, other example aspects of the rotor top plate 110 may not comprise the rotor top flange 311. Some aspects of the rotor top plate 110 can further comprise one or more alignment pins 313 configured to engage corresponding alignment holes (not shown) in the rotor sidewall 120 (shown in FIG. 1). The alignment pins 313 can aid in aligning the coupling bores 207 (shown in FIG. 2) of the rotor top plate 110 with the coupling bores 807 (shown in FIG. 8) of the rotor sidewall 120 (shown in FIG. 1) for easy attachment of the rotor top plate 110 to the rotor sidewall 120. The alignment pins 313 can eliminate the need for large alignment surfaces and, thus, can further aid in reducing the number of mechanical interfaces and associated tolerances that can affect the dimensions of the air gap 101 (shown in FIG. 1). The rotor bottom plate 115 (shown in FIG. 1) can be configured substantially the same as the rotor top plate 110.

Figure 4:
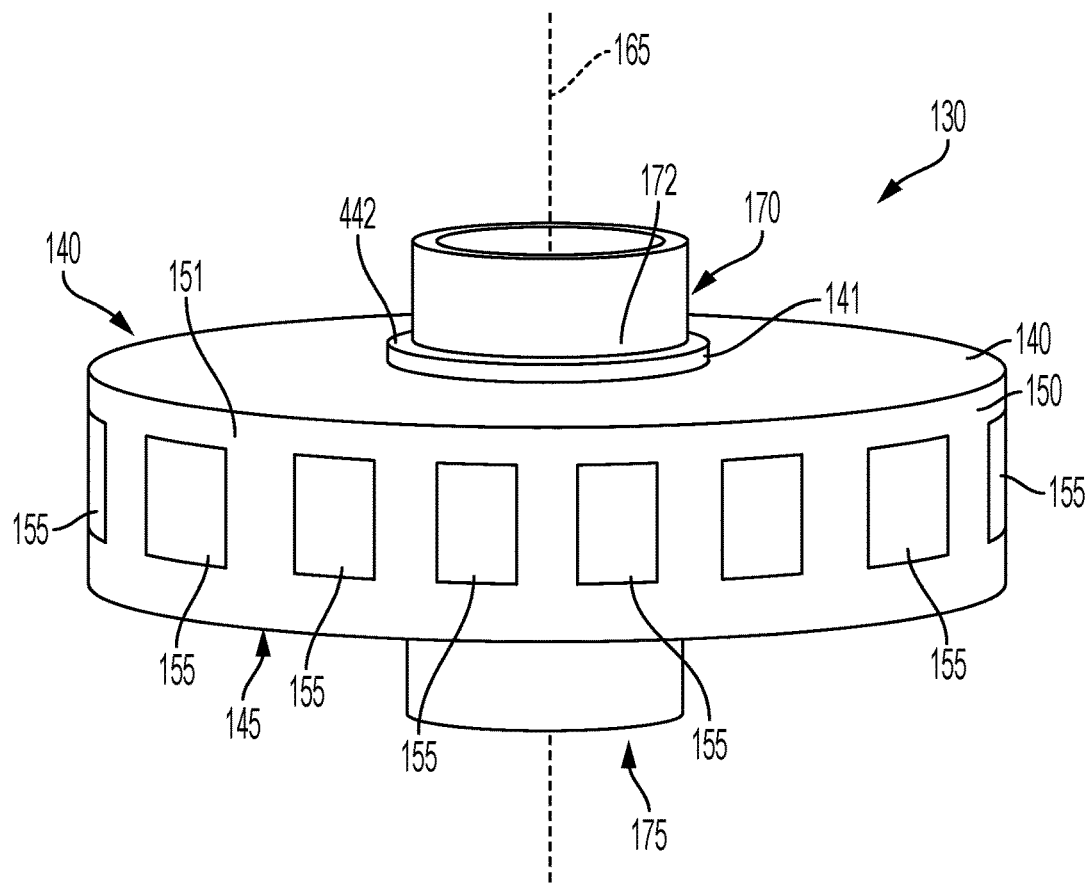
FIG. 4 is a perspective view of a stator of the rotating machine of FIG. 1.

FIG. 4 illustrates an example aspect of the stator 130. As shown, each of the stator top surface 140 and stator bottom surface 145 can define a substantially planar surface and can extend substantially parallel to one another. The cylindrical stator sidewall 150 can extend between the stator top surface 140 and stator bottom surface 145 substantially in the axial direction relative to the central axis 165. As shown, a plurality of the electromagnets 155 can be coupled to the outer surface 151 of the stator sidewall 150. Each of the electromagnets 155 can be equidistantly spaced apart in some aspects. As described above, in other aspects, electromagnetic windings can extend radially around the outer surface 151 of the stator sidewall 150. In some aspects, the electromagnets 155 or electromagnetic winders can be received in a groove (not shown) formed in the stator sidewall 150 and extending radially inward.

The top mounting flange 170 can extend from the stator top surface 140 and the bottom mounting flange 175 can extend from the stator bottom surface 145 substantially in the axial direction relative to the central axis 165. The top lip 141 can extend from the stator top surface 140 around the proximal end 172 of the top mounting flange 170, and the bottom lip 146 (shown in FIG. 1) can similarly extend around the proximal end 177 (shown in FIG. 1) of the bottom mounting flange 175. As shown, the top lip 141 can define an engagement surface 442 configured to abut the top bearing 180 (shown in FIG. 1) and to space the top bearing 180 from the stator top surface 140. The bottom lip 146 can comprise a similar engagement surface 442 for spacing the bottom bearing 190 (shown in FIG. 1) from the stator bottom surface 145.

Figure 5:
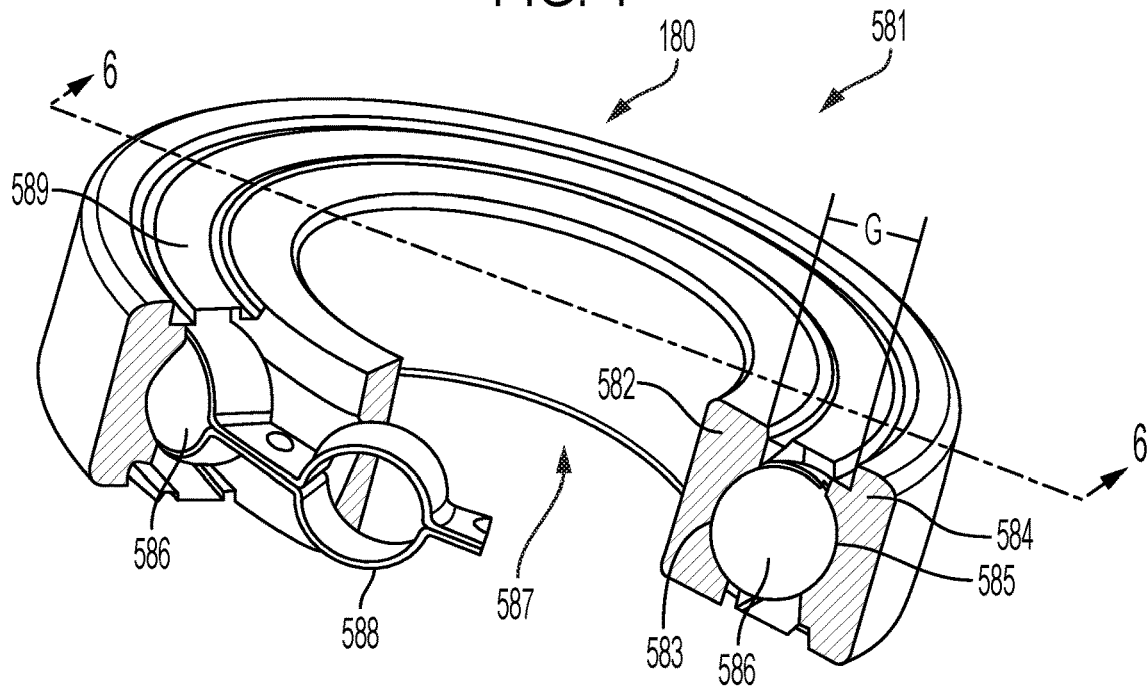
FIG. 5 is a cutaway view of a bearing of the rotating machine of FIG. 1.

FIG. 5 illustrates an example aspect of the top bearing 180. The top bearing 180 can be substantially the same as the bottom bearing 190 (shown in FIG. 1). As shown, the top bearing 180 can be, for example, a deep groove ball bearing 581. In other aspects, the top bearing 180 can be any other suitable type of bearing or anti-friction mechanism. The top bearing 180 can comprise an inner race 582, an outer race 584, and one or more bearing balls 586 received therebetween. The inner race 582 can define a top bearing bore 587.

Furthermore, as shown, each of the bearing balls 586 can engage an inner race groove 583 of the inner race 582 and an outer race groove 585 of the outer race 584. Some aspects of the top bearing 180 can also comprise a separator 588 configured to maintain a desired space between each of the bearing balls 586. According to example aspects, the bearing balls 586 can rotate within the inner and outer race grooves 583,585, such that the outer race 584 can rotate relative to the inner race 582, or vice versa. As shown, example aspects of the top bearing 180 can define a gap G between the inner race 582 and outer race 584. Some aspects of the top bearing 180 can further comprise a seal 589, as shown, or a shield configured to span the gap G and to protect the bearing balls 586 from contaminants. The seal 589 can be formed from rubber in some aspects, or any other suitable material, such as metal or plastic.

As described above, the top bearing 180 can be mounted on the stator 130 (shown in FIG. 1), with the inner race 582 engaging the top mounting flange 170 (shown in FIG. 1), and the rotor 105 (shown in FIG. 1) can be mounted on the top bearing 180, with the outer race 584 engaging the peripheral edge 112 of the top opening 211 (shown in FIG. 2). In example aspects, the top bearing 180 can be coupled to each of the stator 130 and rotor 105 by a friction fit. In other aspects, a fastener (not shown) can couple the top bearing 180 to the stator 130 and/or rotor 105. For example, in one aspect, a clip can engage each of the top bearing 180 and the rotor top plate 110 (shown in FIG. 1) to maintain the top bearing 180 in engagement with the rotor 105 when the rotating machine 100 is pre-loaded during assembly. In other aspects, another suitable fastener can be used. The bottom bearing 190 (shown in FIG. 1) can be coupled to the rotor bottom plate 115 (shown in FIG. 1) and the bottom mounting flange 175 (shown in FIG. 1) in a substantially similar manner.

Figure 6:
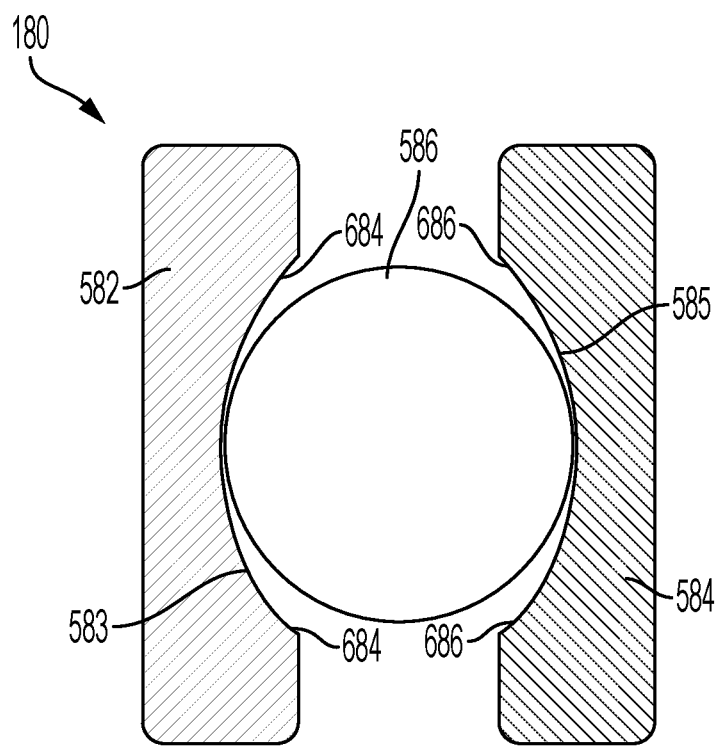
FIG. 6 is a simplified cross-sectional view of the bearing of FIG. 5 in an unloaded condition, taken along line 6-6 in FIG. 5.

FIG. 6 is a simplified cross-sectional view of the top bearing 180 in an unloaded condition. As noted above, the bottom bearing 190 (shown in FIG. 1) can be substantially the same as the top bearing 180. As shown, the top bearing 180 can comprise the bearing balls 586 engaged with the inner race groove 583 of the inner race 582 and the outer race groove 585 of the outer race 584. In the unloaded condition, the inner and outer races 582,584 can be substantially aligned in the axial direction, as shown. However, due to the clearance between the bearing balls 586 and opposing sides 684,686 of the inner and outer race groove 583,585, respectively, the inner race 582 and outer race 584 can slide on the bearing balls 586 in the axial direction, potentially causing misalignment of various components of the rotating machine 100 during operation. As such, it can be desirable to pre-load the top bearing 180 and bottom bearing 190 to prevent sliding of the corresponding inner and outer races 582,584 during operation.

Figure 7:
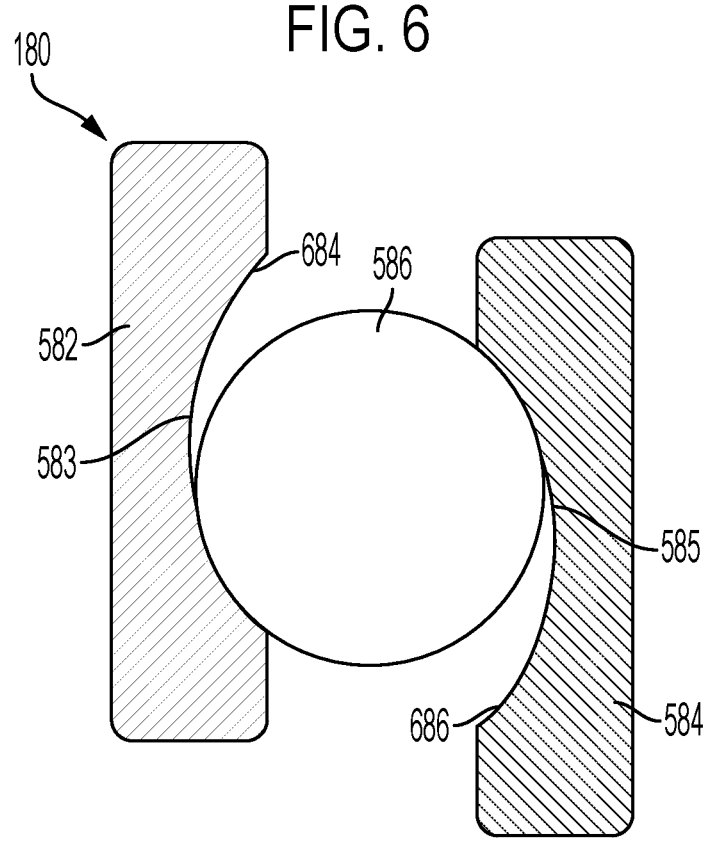
FIG. 7 is a simplified cross-sectional view of the bearing of FIG. 5 in a pre-loaded condition, taken along line 6-6 in FIG. 5.

FIG. 7 is a simplified cross-sectional view of the top bearing 180 in a pre-loaded condition. Again, the bottom bearing 190 (shown in FIG. 1) can be substantially the same as the top bearing 180. In the pre-loaded condition, the top bearing 180 can be intentionally subjected to axial forces prior to operation of the rotating machine 100 to axially displace, relative to the central axis 165, the inner and outer races 582,584 of the top bearing 180. With the inner and outer races 582,584 already axially displaced as shown, additional forces applied to the top bearing 180 during operation will not cause further axial displacement of the inner and outer races 582,584, and as such, will reduce or eliminate the likelihood of misalignment of various components.

Figure 8:
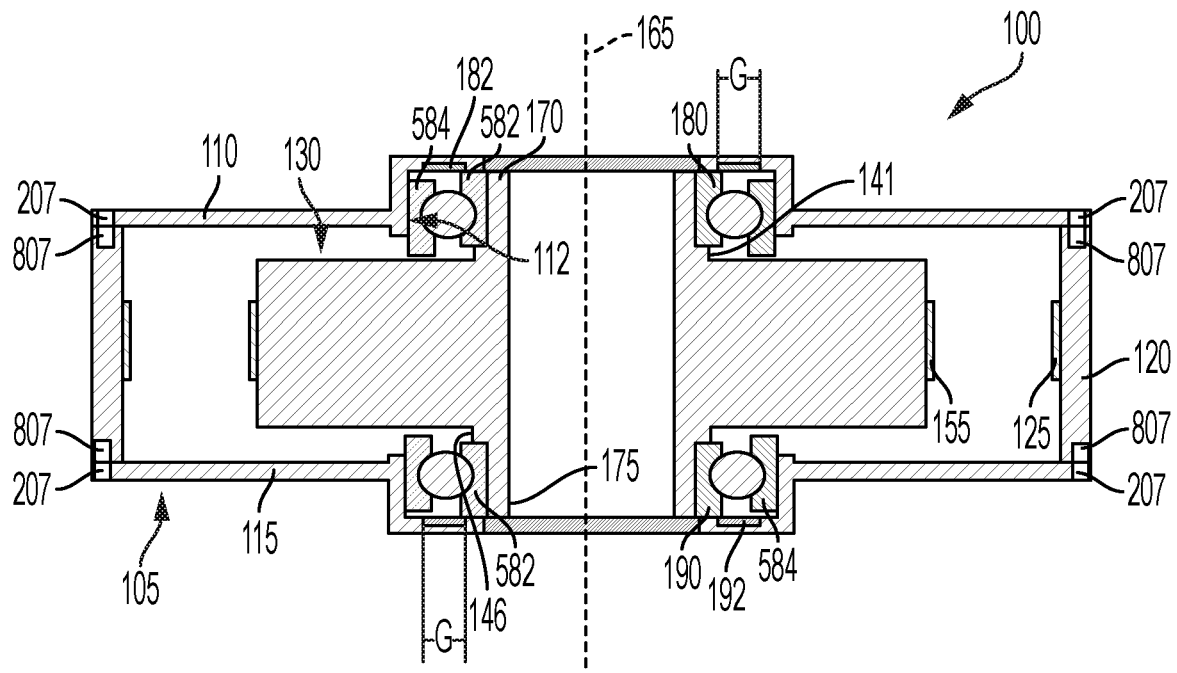
FIG. 8 is a cross-sectional view of the rotating machine of FIG. 1 with a pair of the bearings of FIG. 5 in the pre-loaded condition.

FIG. 8 illustrates the rotating machine 100 with each of the top bearing 180 and bottom bearing 190 in the pre-loaded condition. A method for pre-loading the rotating machine 100 can comprise pressing the top bearing 180 into the top opening 211 (shown in FIG. 2) of the rotor top plate 110, such that the outer race 584 engages the peripheral edge 112 of the top opening 211. In example aspects, the top bearing 180 can be attached to the rotor top plate 110 by a mechanical fastener, such as a clip, or by a friction force. A next step can comprise mounting the top bearing 180 to the top mounting flange 170 of the stator 130 by inserting the top mounting flange 170 through the top bearing bore 587 (shown in FIG. 5). When received on the top mounting flange 170, the inner race 582 of the top bearing 180 can abut the engagement surface 442 (shown in FIG. 4) of the top lip 141 of the stator 130. The bottom bearing 190 can be mounted to the rotor bottom plate 115 and the bottom mounting flange 175 of the stator 130 in the same way.

According to example aspects, the dimensions of the stator 130 and rotor 105 can be configured such that, when the inner races 582 of the top and bottom bearings 180,190 abut the top and bottom lips 141,146 of the stator 130, respectively, the rotor top plate 110 and rotor bottom plate 115 can be axially spaced from the rotor sidewall 120 relative to the central axis 165. As such, attaching the rotor top plate 110 to the rotor sidewall 120 can comprise engaging a fastener (not shown), such as a screw, with each of the coupling bores 207 of the rotor top plate 110 and the corresponding coupling bores 807 of the rotor sidewall 120. The method can further comprise tightening each of the fasteners. In example aspects, tightening each of fasteners can draw the rotor top plate 110 towards the rotor sidewall 120 in the axial direction relative to the central axis 165. The outer race 584 of the top bearing 180 can slide in the axial direction, relative to the central axis 165, with the rotor top plate 110, and the inner race 582 can remain stationary abutting the top lip 141 of the stator 130, such that the outer race 584 is axially displaced relative to the inner race 582. As such, tightening the fasteners to attach the rotor top plate 110 to the rotor sidewall 120 can apply axial forces to the top bearing 180 to place the top bearing 180 in the pre-loaded condition. The rotor bottom plate 115 can be similarly attached to the rotor sidewall 120 to place the bottom bearing 190 in the pre-loaded condition.

As shown, the top conductive element 182 can substantially bridge the gap G (shown in FIG. 5) between the inner and outer races 582, 584 of the top bearing 180, and the bottom conductive element 192 can substantially bridge the gap G between the inner and outer races 582,584 of the bottom bearing 190. In some aspects, excess electrical charges can be induced by the rotating machine 100 during operation. Each of the top and bottom conductive elements 182,192 can be configured to ground (i.e., remove) the excess electrical charges. Grounding the excess electrical charges via the top and bottom conductive elements 182,192 can reduce or eliminate the excess electrical charges traversing through the top and bottom bearings 180,190, which can protect and increase the lifespan of the top and bottom bearings 180,190.

Figure 9:
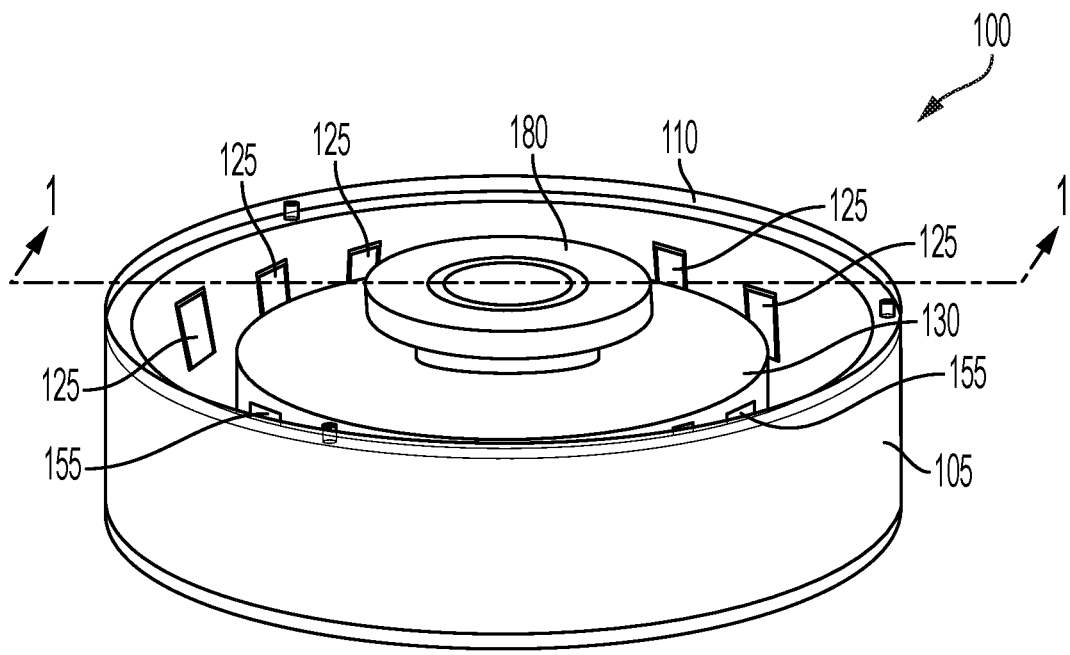
FIG. 9 is a perspective view of the rotating machine of FIG. 1.

FIG. 9 illustrates a perspective view of the rotating machine 100, with the rotor top plate 110 illustrated as transparent for visibility into the interior of the rotating machine 100. According to example aspects, a method for using the rotating machine 100 can comprise providing a static element (e.g., the stator 130) and a dynamic element (e.g., the rotor 105), directly mounting an anti-friction mechanism (e.g., the top bearing 180) to one of the static element and the dynamic element, mounting the other of the static element and dynamic element directly to the anti-friction mechanism, generating a magnetic field with a magnetized material (e.g., the permanent magnets 125), interacting a conductor (e.g. the electromagnets 155) with the magnetic field to generate a rotational force, and applying the rotational force to the dynamic element to rotate the dynamic element with respect to the static element.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A rotating machine comprising:
   a stator defining a stator body, a top and bottom mounting flange monolithically formed with the stator body and operative to circle and engage with a shaft having an axis extending therethrough, a top and bottom annular lip extending from the stator body and encircling the top and bottom mounting flange respectively, the stator body defining a cylindrical stator sidewall distal to the mounting flanges, wherein the stator body, the cylindrical stator sidewall, the annular lips, and the mounting flanges are monolithically formed with one another;
   a rotor defining a rotor sidewall at least partially defining an interior cavity of the rotor, one or more permanent magnets coupled with an inner surface of the rotor sidewall, the rotor further defining an opening formed through the rotor and allowing access to the interior cavity, the stator received within the interior cavity, the mounting flanges extending to the opening;
   a top and bottom bearing defining a top and bottom bearing bore, the top and bottom annular lip abutting the top and bottom bearing respectively, and the top and bottom mounting flanges extending into the top and bottom bearing bore respectively to directly mount the top and bottom bearing on the top and bottom mounting flange respectively, the top and bottom bearings engaging a peripheral edge of the opening to mount the rotor on the top and bottom bearings;
   wherein an electromagnet is coupled with the cylindrical stator sidewall to interact with the one or more permanent magnets;
   the top and bottom bearings having an inner race and an outer race;
   a top and bottom rotor plate coupled with the rotor sidewall and applying an axial force to the outer races of the top and bottom bearings to pre-load the top and bottom bearings wherein the outer race of the top and bottom bearing are oriented in an axially displacement relative to the inner race of the top and bottom bearing respectively with the at least a portion of the outer race of the top and bottom bearing positioned in the interior cavity; and
   a top bearing cover and a bottom bearing cover engaging with the outer race of the top bearing and the outer race of the bottom bearing respectively by friction fit without the top bearing cover and the bottom bearing cover engaging with the inner races of the top bearing and the bottom bearing respectively.

2. The rotating machine of claim 1, wherein the top and bottom bearings are deep groove ball bearings.

3. The rotating machine of claim 1, wherein the stator engages an inner race of the top and bottom bearings and the rotor engages an outer race of the top and bottom bearings respectively, and wherein the rotor is configured to rotate relative to the stator.

4. The rotating machine of claim 1, further comprising an air gap formed between the inner race of the top bearing and the top cover and between the inner race of the bottom bearing and the bottom cover to enable the rotor with pre-loaded top and bottom bearings to rotate about the axis in a clockwise or counter clockwise direction without the inner race of the top bearing and bottom bearing engaging with the top or the bottom bearing cover respectively.

5. The rotating machine of claim 4, wherein the top and bottom rotor plates comprising one or more alignment pins and the rotor sidewall forming one or more alignment holes, the one or more alignment pins of the top and bottom rotor plates in engaging with the one or more alignment holes.

6. The rotating machine of claim 4, wherein:
   the top rotor plate and bottom rotor plate are coupled to the rotor sidewall by a fastener, the top and bottom bearings are configurable in an unloaded condition and a pre-loaded condition, the fastener is in a loosened configuration when the top and bottom bearings are in the unloaded condition, and the fastener is in a tightened configuration when the top and bottom bearings are in the pre-loaded condition.

7. The rotating machine of claim 1, further comprising a conductive element proximate the top and bottom bearings, the conductive element configured to ground an electrical charge.

8. The rotating machine of claim 7, wherein an annular gap extends between the inner race and the outer race of the top and bottom bearings respectively, and wherein the conductive element is annular in shape and bridges the annular gap between the inner race and the outer race of the top and bottom bearings respectively.

9. The rotating machine of claim 1, wherein the top and bottom bearing covers cover an external end of the top and bottom bearings respectively that is disposed distal to the interior cavity.

10. The rotating machine of claim 9, further comprising a conductive element oriented between the top and bottom bearing cover and the external end of the top and bottom bearing operative to electrically engage with at least one inner race and outer race to pass electricity between the at least one inner race and outer race.

11. The rotating machine of claim 9, wherein the top and bottom bearing covers define a planar cover plate covering the external end of the top and bottom bearings, and an annular cover sidewall extending along a side of the top and bottom bearings.

12. The rotating machine of claim 1, wherein a distance between closest points on the outer races being positioned closer to each other than a distance between closest points of the inner races.

13. The rotating machine of claim 1, wherein the outer race of the top and bottom bearings are oriented in the axially displacement relative to the inner race of the top and bottom bearing respectively with the outer races being displaced parallel to the axis.

14. A method for pre-loading a rotating machine comprising:
providing a stator and a rotor of the rotating machine, the rotor comprising a rotor sidewall at least partially defining an interior cavity and having one or more permanent magnets coupled with an inner surface of the rotor sidewall, the stator comprising a stator body, a top and bottom mounting flange monolithically formed with the stator body, and a top and bottom annular lip extending from the body and encircling the top and bottom mounting flange respectively, the stator body defining a cylindrical stator sidewall distal to the mounting flanges, wherein the stator body, the cylindrical stator sidewall, and the mounting flanges are monolithically formed with one another, the stator body extending radially outward from the mounting flanges to orient the cylindrical stator sidewall proximate to the rotor sidewall;
directly mounting a top and bottom bearing to the top and bottom mounting flange of the stator and directly mounting the rotor to the top and bottom bearing in an unloaded state, wherein the top and bottom bearings comprise an inner race and an outer race;
engaging the top and bottom mounting flange with the inner race of the top and bottom bearing and engaging the rotor with the outer race of the top and bottom bearings;
abutting the top and bottom annular lip with the top and bottom bearing respectively;
coupling the one or more permanent magnets with the inner surface of the rotor sidewall;
applying an axial force to the top and bottom bearing in a pre-loaded state to axially displace the inner races of the top and bottom bearing relative to the outer races of the top and bottom bearing such that the outer races move toward each other while the inner races remain stationary; and
engaging by friction fit a top bearing cover and a bottom bearing cover with the outer race of the top bearing and the outer race of the bottom bearing respectively without engaging the top bearing cover and the bottom bearing cover with the inner races of the top bearing and the bottom bearing respectively.

15. The method of claim 14, wherein:
a gap is defined between the inner race and the outer race; and
the rotating machine further comprises a conductive element, the conductive element bridging the gap between at least one of the inner races and the outer races to pass electricity between the at least one of the inner races and the outer races.

16. A method for using a rotating machine comprising:
providing a static element and a dynamic element, the dynamic element comprising a sidewall at least partially defining an interior cavity of the dynamic element, the static element received within the interior cavity, the static element defining a body, a top and bottom annular lip extending from the body and encircling a top and bottom mounting flange, the body defining a cylindrical body sidewall concentric to and distal to the top and bottom mounting flange, the top and bottom mounting flange, the body, the top and bottom annular lip, and the cylindrical body sidewall monolithically formed with one another;
coupling a magnetized material with an inner surface of a sidewall of the dynamic element;
mounting a top and bottom anti-friction element on the top and bottom mounting flange respectively, the top and bottom anti-friction element having an inner race and an outer race;
directly abutting the inner races of the top and bottom anti-friction element with the top and bottom annular lip encircling the top and bottom mounting flange respectively;
engaging the top and bottom anti-friction element with a peripheral edge of the interior cavity to mount the dynamic element on the outer race of the top and bottom anti-friction element;
coupling an electromagnet with the cylindrical body sidewall to interact with the magnetized material;
coupling a top and bottom plate with the sidewall of the dynamic element;
directly mounting the dynamic element to the anti-friction element by applying an axial force to the outer race of the top and bottom anti-friction element with the top and bottom plate to pre-load the top and bottom anti-friction element by orienting the inner race of the top and bottom anti-friction element in an axially displacement relative to the outer race of the top and bottom anti-friction element respectively and by positioning at least a portion of the outer race of the top and bottom anti-friction element in the interior cavity;
engaging by friction fit a top bearing cover and a bottom bearing cover with the outer race of the top anti-friction element and the outer race of the bottom anti-friction element respectively while maintaining an air gap a) between the inner race of the top anti-friction element and the top bearing cover, and b) between the inner race of the bottom anti-friction element and the bottom bearing cover;
generating a magnetic field within the interior cavity with the magnetized material;
interacting the electromagnet with the magnetic field to generate a rotational force; and
applying the rotational force to the dynamic element to rotate the dynamic element relative to the static element.

17. The method of claim 16, wherein the static element is a stator, the dynamic element is a rotor, and the top and bottom anti-friction element are bearings.

\* \* \* \* \*